United States Patent [19]

Ekiner et al.

[11] Patent Number: 4,863,496

[45] Date of Patent: Sep. 5, 1989

[54] REACTIVE POSTTREATMENT FOR GAS SEPARATION MEMBRANES

[75] Inventors: Okan M. Ekiner, Wilmington; Richard A. Hayes, Hockessin; Philip Manos, Wilmington, all of Del.

[73] Assignee: E. I. Du Pont de Nemours and Co., Wilmington, Del.

[21] Appl. No.: 175,500

[22] Filed: Apr. 13, 1988

[51] Int. Cl.$^4$ .............................................. B01D 53/22
[52] U.S. Cl. ............................................ 55/158; 55/16
[58] Field of Search ......................................... 55/16, 158

[56] References Cited

U.S. PATENT DOCUMENTS

| | | | |
|---|---|---|---|
| 3,980,456 | 9/1976 | Browall | 55/158 |
| 4,214,020 | 7/1980 | Ward et al. | 55/16 X |
| 4,230,463 | 10/1980 | Henis et al. | 55/16 |
| 4,484,935 | 11/1984 | Zampini | 55/158 |
| 4,493,714 | 1/1985 | Ueda et al. | 55/158 X |
| 4,505,985 | 3/1985 | Schmidt et al. | 428/447 |
| 4,533,369 | 8/1985 | Okita | 55/16 X |
| 4,575,385 | 3/1986 | Brooks et al. | 55/158 |
| 4,613,440 | 9/1986 | Zupancic et al. | 55/158 X |
| 4,613,625 | 9/1986 | Ford | 521/53 |
| 4,634,531 | 1/1987 | Nakagawa et al. | 210/639 |
| 4,652,283 | 3/1987 | Zampini et al. | 55/16 X |
| 4,654,055 | 3/1987 | Malon et al. | 55/158 |
| 4,659,474 | 4/1987 | Perry et al. | 210/638 |
| 4,728,346 | 3/1988 | Murphy | 55/16 X |
| 4,776,936 | 10/1988 | Smith et al. | 55/16 X |

FOREIGN PATENT DOCUMENTS

| | | | |
|---|---|---|---|
| 107636 | 2/1984 | European Pat. Off. | |
| 3712492 | 10/1987 | Fed. Rep. of Germany | 55/158 |
| 55-104608 | 8/1980 | Japan | 55/16 |
| 57-94307 | 6/1982 | Japan | |
| 58-193701 | 11/1983 | Japan | 55/158 |
| 59-059220 | 4/1984 | Japan | 55/158 |
| 61-107921 | 5/1986 | Japan | |
| 62-227423 | 10/1987 | Japan | 55/158 |
| 63-080826 | 4/1988 | Japan | 55/158 |

*Primary Examiner*—Robert Spitzer

[57] ABSTRACT

A process for applying and polymerizing a monomeric material to a gas separation membrane to improve the permselectivity of the membrane with respect to at least one pair of gases is disclosed.

43 Claims, No Drawings

REACTIVE POSTTREATMENT FOR GAS SEPARATION MEMBRANES

BACKGROUND OF THE INVENTION

Field of the Invention

The present invention relates to a process for improving the selectivity of a gas separation membrane wherein a monomeric material is applied to the surface of the membrane and allowed to polymerize to effectively seal defects in the membrane.

Prior Art

U.S. Pat. No. 3,325,330 discloses a multicomponent gas separation membrane comprising a porous membrane coated with the lamination of two films, thus reducing the likelihood of defects protruding through the coating.

U.S. Pat. No. 3,874,986 and U.S. Pat. No. 3,980,456 disclose a multicomponent gas separation membrane comprising a laminate on a porous membrane.

U.S. Pat. No. 4,230,463 discloses a multicomponent gas separation membrane comprising a coating on a porous membrane.

EPO No. 0 107 636 discloses a multicomponent gas separation membrane comprising a porous anisotropic substrate membrane and a coating which is the condensation product of a silanol terminated poly(dimethylsiloxane) and any of certain cross linking compounds.

U.S. Pat. No. 4,575,385 discloses a multicomponent gas separation membrane comprising a porous anisotropic substrate membrane and a coating of monomeric permeation modifiers.

U.S. Pat. No. 4,634,531 discloses a multicomponent reverse osmosis separation membrane comprising a porous anisotropic substrate membrane and a coating which is the condensation product of amines and aldehydes.

U.S. Pat. No. 4,654,055 discloses a multicomponent gas separation membrane comprising a porous anisotropic substrate membrane and a coating comprising a Lowry-Bronsted base.

U.S. Pat. No. 4,659,474 discloses multicomponent ultrafiltration and reverse osmosis separation membranes comprising a porous anisotropic substrate membrane and a coating which is the condensation product of a polyethylene imine and any of certain crosslinking compounds.

U.S. Pat. No. 4,613,625; U.S. Pat. No. 4,661,526; and U.S. Pat. No. 4,668,706 disclose a multicomponent ultrafiltration separation membrane comprising an aliphatic polyamide porous anisotropic substrate and a coating which is the condensation product of the substrate and any of certain crosslinking compounds.

U.S. Pat. No. 4,484,935 discloses a multicomponent gas separation membrane comprising a porous anisotropic substrate membrane and a coating which is the condensation product of reactive poly(dimethylsiloxane) with and any of certain crosslinking compounds with modified silane monomers.

U.S. Pat. No. 4,505,985 discloses a multicomponent separation membrane comprising a porous substrate membrane and a coating based on silicic acid heteropolycondensates produced by hydrolytic polycondensation of a silicic acid derivative in the presence of water with an optional condensation catalyst and modifiers.

Japanese Patent Application Publication Kokai: 57-94307 discloses a multicomponent reverse osmosis separation membrane comprising a dry composite semipermeable membrane treated with an aqueous surfactant solution.

Japanese Patent Application Publication Kokai: 61-107921 discloses a multicomponent gas separation membrane comprising a porous substrate and a coating which is the condensation product of a reactive acetylene monomer with a catalyst.

Summary

The present invention relates to a process for effectively sealing defects in a membrane to improve the permselectivity of the membrane with respect to at least two or more gases. The treatment involves applying a monomer in a fluid to the surface of the membrane. The monomer then polymerizes to seal defects on the membrane.

Detailed Description

Most commercial gas separation membranes are asymmetric in nature. They are made by casting a film or extruding a hollow fiber from a solution of a polymer in a solvent mixture, evaporating a portion of the solvent from one side of the film or the outside of the fiber and quenching in a nonsolvent. The resulting asymmetric membrane is characterized by a thin film of polymer supported by a generally cellular substructure. This provides a membrane having a thin effective separation member, which results in a high flux or permeation rate, which is highly desirable. However, this effort to form a highly permeable membrane also leads to the formation of submicroscopic holes which pass gases indiscriminately causing the membrane to have an effective separation value for most pairs of gases which is less than the intrinsic separation value of the polymer from which the membrane is made.

The process of the present invention is most effective on membranes which have a relatively wide range of hole sizes. The range of hole sizes which protrude through the dense separating layer of a membrane can be quantified by the ratio of total membrane surface area to total protruding hole cross-sectional area and/or the average hole diameter protruding through the dense separating layer of the separation membrane. The separation membranes useful in the present invention typically have total membrane surface area to total protruding hole cross-sectional area ratios of at least 10:1 up to $10^{12}$:1 or greater. More preferably the ratios range from $10^3$:1 to $10^9$:1. The average hole diameter protruding through the dense separating layer of the separation membrane may vary widely and may range from approximately 5 to 20,000 angstroms. More preferably the average hole diameter ranges from approximately 5 to 1,000 angstroms. It is an object of this invention that a wide range of hole sizes and distributions can be advantageously healed by the processes described herein. The range of hole sizes which protrude through the dense separating layer of a separation membrane can be estimated by the selectivity of one gas over another gas for at least one pair of gases permeating through the membrane. The difference between the intrinsic separation factor for a material and the separation factor for a membrane prepared from that material can be related to the contribution of submicroscopic holes which protrude through the membrane's dense separation layer. These holes essentially pass gases indiscriminately. Thus the preferred membrane starting materials have a selectivity of about 2 or greater for the pair of gases helium and nitrogen more preferably, about 2 to 30.

The selectivity of one gas over another in a multicomponent mixture by permeation through a gas separation membrane is controlled, in part, by the molecular free volume in the dense separating layer of the membrane. To obtain the intrinsic gas selectivity of a membrane, a perfect pinhole-free, dense separating layer must be formed in the membrane formation process. The integrity of this separating layer must be maintained throughout the gas separations module to retain a high gas membrane selectivity. This idealized pinhole free membrane separating layer could be prepared by increasing the thickness of the layer. In doing so, holes would not be able to protrude through the separating layer; however, this results in a reduction of the gas permeation rate through the membrane.

Imperfections and defects in the dense separating layer of gas membranes arise in the membrane formation process and in consequent membrane handling, module fabrication and system fabrication steps. The effective gas membrane separating efficiency can be advantageously enhanced by chemical treatment of the membranes to seal the defects. The materials and processes disclosed herein achieve this goal and surpass that taught in the prior art.

The process of the present invention entails the controlled application of a reactive monomeric substance within the gas separations membrane or on the surface of the gas separations membrane. The reactive monomeric substance may be diluted in a noninteracting fluid. After application, the reactive monomeric substance chemically reacts to form a polymer, subsequent to its application. This effectively seals defects and imperfections of the membrane with, consequent, enhanced gas productivity.

A reactive monomeric substance is defined as a difunctional to polyfunctional chemical entity which can be activated by a catalyst or other activating chemical species to form a polymer. Reactive monomeric substances disclosed herein include diisocyanates, di- and trihalo silanes, di- and triacetoxysilanes and di- and trialkoxy silanes. This procedure should not be considered limited to these alone.

The reactive monomeric substances may react with another substance within the membrane or in the atmosphere about the membrane. For example, alkyl trichlorosilanes are believed to react with moisture either in the membrane or from the atmosphere to make alkylsilanols. Such alkyl silanols are then believed to spontaneously condense with themselves to form poly(alkylsiloxanes).

The reactive monomeric substances are further defined as being essentially non-polymeric. The molecular weight of these materials is substantially under 1,000 atomic units, preferably under 500 atomic units. It has been found that the small molecular size of these components offers advantages over that found in the prior art. The small molecular size of these components allows them to penetrate more effectively into the membrane defects. The reactive chemical substances are then anchored in place through reaction as described above. This allows for improved sealing of the membrane than is taught in the prior art. Thus the polymer is believed to form and grow within the holes in the membrane.

Non-interacting fluids are defined as gases or liquids which do not substantially interfere with the reactive monomeric substance, the process of this procedure, the material of composition of the membrane or the membrane structure and morphology. Examples disclosed herein are nitrogen gas, helium gas, argon gas, hydrocarbon liquids, and halocarbon liquids. This should not, however, be taken as a limitation of this procedure.

This sealing procedure is, however, useful for a wide variety of membrane compositions and types. Membrane materials may include polyamides, polyimides, polyesters, polyethers, polyether ketones, polyether imides, polyethylenes, polyacetylenes, polyether sulfones, polysulfones, polysiloxanes, polyvinylidene fluoride, polybenzimidazoles, polybenzoxazoles, polyacrylonitrile, cellulose acetate, polyazoaromatics, and copolymers thereof. This should not be considered limiting. The sealing procedure of the present invention is substantially useful for any membrane material composition. Further, this procedure will find utility for many membrane morphologies, such as asymmetric or composite membranes.

This membrane is preferably in the form of a hollow fiber. The polymeric substrate membrane can be the type described by Cabasso et al. in "Research and Development of NS-1 and Related Polysulfone Hollow Fibers for Reverse Osmosis Desalination of Seawater", NTIS, PB-248 666, 7/1975 and is preferably formed from an aromatic polyamide polymer.

The polymeric substrate membrane is preferably in the form of a hollow fiber having an outside diameter of about 75 to 1,000 microns, and preferably 175 to 350 microns, and a wall thickness of about 25 to 300 microns. Preferably the diameter of the bore of the fiber is about one quarter to three quarters the outside diameter of the fiber. The preferred aromatic polyamide membranes are porous with the average cross-sectional diameter of the pores varying within the range of 5 to 20,000 Angstroms. The pore sizes are greater in the interior of the membrane and lesser near the surfaces of the membrane, such that the membrane is anisotropic or asymmetric. The porosity of the membrane is sufficient that the void volume of the membrane is within the range of 10 to 90, preferably about 30 to 70 percent based on the superficial volume, i.e., the volume contained within the gross dimensions of the porous separation membrane.

The intimate mechanistic details of this procedure are not well understood. They may vary for different material compositions. It is clear that the procedure reduces the effects that membrane defects and imperfections have on the gas productivity. This is believed to be due to healing of these defects and imperfections through plugging or partial plugging.

The reactive nature of the monomeric sealing components disclosed herein offer great advantages over the prior art. This reactivity allows greater contact and adhesion of the sealing materials to the membrane. A larger range of pore sizes can be effectively plugged by this procedure than is disclosed in the prior art. For example, Browall in U.S. Pat. No. 3,980,456 disclose the use of a preformed organopolysiloxane-polycarbonate copolymer sealing material. This procedure suffers in that the polymeric sealing material cannot effectively intrude into pores to plug them and is, therefore, only effective by applying a thin coating on top of the membrane material. This causes a substantial loss in membrane productivity. Henis and Tripodi in U.S. Pat. No. 4,230,463, teach that membrane sealing materials are only effective if their molecular size is sufficiently large to preclude being drawn through the pores of the porous separation membrane during coating and/or separation operations (U.S. Pat. No. 4,230,463, col. 19, line 25-32; col. 28, line 55-58; col. 32, line 51-56). Further, they teach that when poly(siloxanes) are used as the membrane sealing material, the polysiloxane molecular weight must be higher than about 1,000 (U.S. Pat. No. 4,230,463; col. 20, line 23-27).

EPO No. 107 636 further teaches that the procedure taught in U.S. Pat. No. 4,230,43 suffers from environmental degradation encountered under some operation conditions. While the EPO No. 107636 disclosure attempts to correct these environmental concerns, it still suffers from applying a coating of polysiloxane diols with molecular weights greater than 10,000 as discussed before.

The membrane sealing procedure disclosed herein does not suffer from this difficulty. The reactive sealing material may be effectively of any molecular size. This allows the substantial plugging of pore sizes too small for other procedures. Larger pore sizes are effectively sealed due to the reactive nature of the sealing material. As the larger pores are filled by the reactive sealing material, the material reacts in place to form a plug to fit the pore size. This allows for greater ease in the sealing procedure than has heretofore been disclosed.

The process of the present invention effects greater selectivity for gas separations membranes used among other things in recovery of hydrogen in refinery and ammonia plants; separation of carbon monoxide from hydrogen in syngas systems; separation of carbon dioxide or hydrogen sulfide from hydrocarbons; enrichment of oxygen and nitrogen from air for increased combustion or inerting streams, respectively.

EXAMPLES

REFERENTIAL EXAMPLE 1

This referential example describes the material and processes by which asymmetric hollow fiber aromatic polyamide gas separation membranes were produced. The hollow fiber membranes are spun from a hollow fiber spinnerette into a water coagulant as has been taught in the prior art.

A polymer solution was prepared with approximately 30% (weight) solids content of a 50:50% (weight) physical mixture of the aromatic polyamide prepared by polycondensation of 2,4,6-trimethyl-1,3-phenylene diamine with a 70:30% (weight) mixture of isophthaloyl chloride and terephthaloyl chloride and the aromatic polyamide prepared by polycondensation of 1,3-phenylene diamine with a 70:30% (weight) mixture of isophthaloyl chloride and terephthaloyl chloride and 30% (weight, based on polymer) lithium nitrate in N,N-dimethylacetamide. The polymer mixture is described in EPO No. 219,878. The above polymer solution was extruded through a hollow fiber spinnerette with fiber channel dimensions of outer diameter (OD) equal to 840 microns $(8.4 \times 10^{-4}$ m) inner diameter (ID) equal 560 microns $(5.6 \times 10^{-4}$ m) at the rate of 43 cc/min. A nitrogen gas pressure of 17 inches of water was maintained in the fiber bore to prevent fiber collapse. The spun fiber passed through a gap length of 6 meters maintained at 150° C. with a slow nitrogen purge into a water coagulant bath at 36° C. The wet fiber was wound up onto a bobbin at the rate of 240 ft/min (79 m/min.).

The water-wet fiber was dehydrated as taught in U.S. Pat. No. 4,080,743; U.S. Pat. No. 4,080,744; U.S. Pat. No. 4,120,098 and EPO No. 219,878. This specifically involved the sequential replacement of water with methanol, the replacement of methanol with Freon ®-113, and drying in a vacuum of 20 inches of mercury.

The fibers were cut into lengths approximately 20 inches (0.51 m) long and the open ends of the fibers were potted in an epoxy resin within a ¼ inch (0.00635 m) diameter stainless steel tube to provide loops approximately 9 inches (0.23m) long. From 10 to 24 fibers were so potted for the individual tests. The tube which was 10" (0.254 m) long and fitted with a gas inlet adjacent the potting resin and a gas outlet for the rejected gas at the end opposite the potting resin. The outlet was only used when mixed gases were being run.

REFERENTIAL EXAMPLE 2

This referential example describes the material and processes by which asymmetric hollow fiber aromatic polyamide gas separation membranes were produced. The hollow fiber membranes are spun from a hollow fiber spinnerette into a water coagulant as has been taught in the prior art.

A polymer solution was prepared with 28% (weight) solids content of the aromatic copolyamide prepared by polycondensation of a 50:50 (molar) mixture of 2,4,6-trimethyl-1,3-phenylene diamine and 1,3-phenylene diamine with a 70:30 % (molar) mixture of isophthaloyl chloride and terephthaloyl chloride and 30% (weight, based on polymer) lithium nitrate in N,N-dimethylacetamide. The polymer is described in EPO No. 219,878.

The above polymer solution was extruded through a hollow fiber spinnerette with fiber channel dimensions of outer diameter (OD) equal to 840 microns $(8.4 \times 10^{-4}$ m) and inner diameter (ID) equal to 560 microns $(5.6 \times 10^{-4}$ m) at the rate of 177 cc per hour at 85° C. A solution of 59.1% (weight) N,N-dimethylacetamide in water was injected into the fiber bore at a rate of 26 cc per hour. The spun fiber passed through an air gap length of 7.5 cm at room temperature into a water coagulant bath maintained at 14.5° C. The fiber was wound up on a drum at the rate of 50 meters per minute.

The water-wet fiber was dehydrated as taught in U.S. Pat. No. 4,080,743; U.S. Pat. No. 4,080,744; U.S. Pat. No. 4,120,098; and EPO No. 219,878. This specifically involved the sequential replacement of water with methanol, the replacement of methanol with Freon ® 113, and drying in a vacuum of 20 inches of mercury. Gas separation modules were prepared as described in Referential Example 1.

EXAMPLES 1-5

Asymmetric polyamide hollow fiber membranes as described in Referential Example 1 were consecutively tested for pure gas helium and nitrogen permeabilities at 400 psig $(2.76 \times 10^6$ Pa), 25° C. Results are reported in Table 1.

The outer surfaces of the polyamide membranes were contacted with a 0.63% 2,4-toluenediisocyanate (TDI) solution (weight) in FREON ® 113 (1,1,2-trichloro-1,2,2 trifluoroethane) at room temperature for the times listed in Table 1. The solution was decanted and the membranes washed with FREON ®113. The membranes were dried with a nitrogen purge and then consecutively tested for pure gas helium and nitrogen permeabilities at 400 psig $(2.76 \times 10^6$ Pa), 25° C. Results are reported in Table 1.

TABLE 1

| Example | Initial PHe(GPU) | He/N$_2$ Selectivity | Solution Contact Time(h) | Treated PHe(GPU) | He/N$_2$ Selectivity |
|---------|------------------|----------------------|--------------------------|------------------|----------------------|
| 1 | 98  | 6.5 | 1.5 | 47 | 188 |
| 2 | 111 | 5.3 | 24  | 49 | 178 |
| 3 | 86  | 6.4 | 1   | 47 | 660 |
| 4 | 110 | 7.4 | 24  | 43 | 443 |
| 5 | 126 | 5.5 | 24  | 51 | 533 |

$$GPU = 10^{-6} \times \frac{cm^3 (STP)}{cm^2 \cdot sec \cdot (cmHg)}$$

CONTROL EXAMPLE 1

An asymmetric polyamide hollow fiber membrane, prepared as described in Referential Example 1 was consecutively tested for pure gas helium and nitrogen permeabilities at 400 psig ($2.76 \times 10^6$ Pa), 25° C. Results are reported below:

| | |
|---|---|
| He Productivity | 47 GPU |
| He/N$_2$ Selectivity | 3.3 |

The outer surfaces of the polyamide hollow fiber membrane were contacted with liquid Freon®-113 for ten minutes at room temperature, and then dried in a vacuum oven (20 inches mercury) at room temperature for 16 hours. The membrane was consecutively tested for pure gas helium and nitrogen permeabilities at 400 psig ($2.76 \times 10^6$ Pa), 25° C. Results are reported below:

| | |
|---|---|
| He Productivity | 43 GPU |
| He/N$_2$ Selectivity | 3.9 |

This example shows that Freon®-113 alone is not effective in sealing defects on the gas separation membrane.

CONTROL EXAMPLE 2

Asymmetric polyamide hollow fiber membranes made as described in Referential Example 1 were consecutively tested for pure gas helium and nitrogen permeabilities at 600 psig ($4.14 \times 10^6$ Pa), 25° C. Results are reported below:

| | |
|---|---|
| He Productivity: | 90 GPU |
| He/N$_2$ Selectivity: | 6 |

EXAMPLES 6–7

The outer surfaces of the polyamide membrane from Control Example 2 were exposed to a nitrogen stream saturated with dimethyldichlorosilane at room temperature and one atmosphere with a vacuum (20 inches [0.51m] mercury) in the fiber bore for the times listed in Table 2. The nitrogen stream was saturated by passing through a cloth impregnated with dimethyldichlorosilane. In Examples 6–17 the alkyl halo silane reacts with water vapor in the atmosphere to form the reactive monomer species. The membranes were then consecutively tested for pure gas helium and nitrogen permeabilities at 600 psig ($4.14 \times 10^6$ Pa), 25° C. Results are reported in Table 2.

TABLE 2

| Example | Exposure Time (min) | PHe (GPU) | He/N$_2$ Selectivity |
|---------|---------------------|-----------|----------------------|
| 6 | 2  | 39   | 280 |
| 7 | 15 | 19.5 | 460 |

EXAMPLE 8

The outer surfaces of the polyamide membrane from Control Example 2 were exposed to a nitrogen stream saturated with methyltrimethoxysilane in the same manner as Examples 6 and 7 for 2 minutes. The membranes were then consecutively tested for pure gas helium and nitrogen permeabilities at 600 psig ($4.14 \times 10^6$ Pa), 25° C. Results are reported below:

| | |
|---|---|
| He Productivity: | 36 GPU |
| He/N$_2$ Selectivity: | 135 |

EXAMPLE 9

The outer surfaces of the polyamide membrane from Control Example 1 were contacted with a 10 wt % ethyltrimethoxysilane solution in FREON® 113 at room temperature for 15 minutes while maintaining a vacuum (20 inches [0.51m] mercury) on the fiber bore. The solution was decanted and the membrane dried in a vacuum (20 inches [0.51 m] mercury) oven at room temperature overnight. The polyamide membrane was then consecutively tested for pure gas helium and nitrogen permeabilities at 600 psig ($4.14 \times 10^6$ Pa), 25° C. Results are reported below:

| | |
|---|---|
| He Productivity: | 11 GPU |
| He/N$_2$ Selectivity: | 210 |

EXAMPLE 10

An asymmetric polyamide hollow fiber membrane made as described in Referential Example 2 was consecutively tested for pure gas helium and nitrogen permeabilities at 600 psig ($4.14 \times 10^6$ Pa), 23.5° C. Results are reported in Table 3. The outer surfaces of the polyamide membrane were contacted with a 5% dimethyldimethoxysilane solution (weight) in Freon®-113 at room temperature for 10 minutes. The solution was decanted and the membrane dried in a vacuum oven (20 inches [0.51m] mercury) at room temperature overnight. The membrane was consecutively tested for pure gas helium and nitrogen permeabilities at 600 psig ($4.14 \times 10^6$ Pa), 24° C. Results are reported in Table 3.

TABLE 3

| Example | Initial PHe (GPU) | He/N$_2$ Selectivity | Treated PHe (GPU) | He/N$_2$ Selectivity |
|---------|-------------------|----------------------|-------------------|----------------------|
| 10 | 109 | 5.8 | 52 | 186 |
| 11 | 109 | 6.5 | 42 | 543 |
| 12 | 96  | 5.4 | 36 | 122 |
| 13 | 102 | 6.4 | 25 | 517 |
| 14 | 118 | 5.1 | 32 | 311 |
| 15 | 110 | 5.3 | 30 | 771 |
| 16 | 110 | 5.0 | 24 | 726 |
| 17 | 118 | 5.4 | 54 | 963 |

EXAMPLE 11

The process described in Example 10 was repeated except a 5% ethyltrimethoxysilane solution (weight) in Freon®-113 was substituted for the 5% dimethyldimethoxysilane solution (weight) in Freon®-113.

EXAMPLE 12

The process described in Example 10 was repeated except a solution of 2.5% dimethyldimethoxysilane and 2.5% ethyltrimethoxysilane (weight) in Freon®-113 was substituted for the 5% dimethyldimethoxysilane solution (weight) in Freon®-113.

EXAMPLE 13

The process described in Example 10 was repeated except a 5% ethyltriacetoxysilane solution (weight) in Freon®-113 was substituted for the 5% dimethyldimethoxysilane solution (weight) in Freon®-113.

EXAMPLE 14

The process described in Example 10 was repeated except a 5% diphenyldiacetoxysilane solution (weight) in Freon®-113 was substituted for the 5% dimethyldimethoxysilane solution (weight) in Freon®-113.

EXAMPLE 15

The process described in Example 10 was repeated except a 5% diphenyldichlorosilane solution (weight) in Freon®-113 was substituted for the 5% dimethyldimethoxysilane solution (weight) in Freon®-113.

EXAMPLE 16

The process described in Example 10 was repeated except a 5% octadecyltrichlorosilane solution (weight) in Freon®-113 was substituted for the 5% dimethyldimethoxysilane solution (weight) in Freon®-113.

EXAMPLE 17

The process described in Example 10 was repeated except a 5% methyltrichlorosilane solution (weight) in Freon®-113 was substituted for the 5% dimethyldimethoxysilane solution (weight) in Freon®-113.

We claim:

1. A process comprising applying a reactive monomeric material having an atomic weight of less than 1000 to a gas separation membrane and causing said monomeric material to react to form a polymer thereby improving the permselectivity of the membrane with respect to at least two or more gases.

2. The process of claim 1 wherein the monomeric material is an isocyanate having at least two isocyanate groups.

3. The process of claim 2 wherein the isocyanate has two isocyanate groups.

4. The process of claim 3 wherein the isocyanate is aromatic.

5. The process of claim 4 wherein the isocyanate is 2,4-toluene diisocyanate.

6. The process of claim 1 wherein the gas separation membrane is in the form of a hollow fiber.

7. The process of claim 6 wherein the gas separation membrane is formed of an aromatic polyamide.

8. The process of claim 1 wherein the monomeric material is a halosilane having at least two halogen groups.

9. The process of claim 8 wherein the halosilane is an alkyl halosilane.

10. The process of claim 9 wherein the alkylhalosilane is selected from the class consisting of dialkyldihalosilanes, alkyltrihalosilanes or mixtures thereof.

11. The process of claim 10 wherein the dialkyldihalosilane is dialkyldichlorosilane.

12. The process of claim 11 wherein the dialkyldichlorosilane is dimethyldichlorosilane.

13. The process of claim 8 wherein the gas separation membrane is in the form of a hollow fiber.

14. The process of claim 13 wherein the gas separation membrane is formed of an aromatic polyamide.

15. The process of claim 8 wherein the halosilane is aromatic.

16. The process of claim 15 wherein the aromatic halosilane is a diaromatic dihalosilane.

17. The process of claim 16 wherein the diaromatic dihalosilane is diaromatic dichlorosilane.

18. The process of claim 17 wherein the diaromatic dichlorosilane is diphenyl dichlorosilane.

19. The process of claim 15 wherein the gas separation membrane is in the form of a hollow fiber.

20. The process of claim 19 wherein the gas separation membrane is formed of an aromatic polyamide.

21. The process of claim 10 wherein the alkyltrihalosilane is alkyltrichlorosilane.

22. The process of claim 21 wherein the alkyltrichlorosilane is selected from the class consisting of methyltrichlorosilane, octadecyltrichlorosilane or mixtures thereof.

23. The process of claim 21 wherein the gas separation membrane is in the form of a hollow fiber.

24. The process of claim 21 wherein the gas separation membrane is formed of an aromatic polyamide.

25. The process of claim 1 wherein the monomeric material is an acetoxysilane having at least two acetoxy groups.

26. The process of claim 25 wherein the acetoxysilane has 2 or 3 acetoxy groups.

27. The process of claim 26 wherein the acetoxysilane is $C_1$ to $C_{18}$ alkyl.

28. The process of claim 27 wherein the alkylacetoxysilane has 3 acetoxy groups.

29. The process of claim 28 wherein the alkyltriacetoxysilane is ethyltriacetoxysilane.

30. The process of claim 25 wherein the gas separation membrane is in the form of a hollow fiber.

31. The process of claim 25 wherein the gas separation membrane is formed of an aromatic polyamide.

32. The process of claim 26 wherein the acetoxysilane is aromatic.

33. The process of claim 32 wherein the aromatic acetoxysilane has 2 acetoxy groups.

34. The process of claim 33 wherein the diaromatic diacetoxysilane is diphenyldiacetoxysilane.

35. The process of claim 32 wherein the gas separation membrane is in the form of a hollow fiber.

36. The process of claim 32 wherein the gas separation membrane is formed of an aromatic polyamide.

37. The process of claim 1 wherein the monomeric material is an alkoxysilane having between two and four alkoxy groups.

38. The process of claim 37 wherein the alkoxysilane is alkyl.

39. The process of claim 38 wherein the alkylalkoxysilane has 2 or 3 alkoxy groups.

40. The process of claim 39 wherein the alkoxy groups are methoxy.

41. The process of claim 40 wherein the alkylmethoxysilane is selected from the class consisting of dimethyldimethoxysilane, methyltrimethoxysilane, ethyltrimethoxysilane, or mixtures thereof.

42. The process of claim 37 wherein the gas separation membrane is in the form of a hollow fiber.

43. The process of claim 37 wherein the gas separation membrane is formed of an aromatic polyamide.

* * * * *